(12) United States Patent
Shukl et al.

(10) Patent No.: US 12,443,499 B1
(45) Date of Patent: Oct. 14, 2025

(54) CONTACTOR INTEGRATION AND PERFORMANCE VALIDATION WITH HARDWARE-IN-THE-LOOP TEST BENCH

(71) Applicant: Caterpillar Inc., Peoria, IL (US)

(72) Inventors: Pavitra Shukl, Bengaluru (IN);
Avinash Dongare, Bangalore (IN);
Manik Jalhotra, Bangalore (IN);
Murali Krishnan Raghupathy, Bangalore (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/636,862

(22) Filed: Apr. 16, 2024

(51) Int. Cl.
*G06F 11/26* (2006.01)

(52) U.S. Cl.
CPC .................... *G06F 11/261* (2013.01)

(58) Field of Classification Search
CPC ...... G06F 11/26; G06F 11/261; G06F 11/263; G06F 11/27; G06F 11/277
See application file for complete search history.

(56) References Cited

U.S. PATENT DOCUMENTS

| | | | | |
|---|---|---|---|---|
| 2016/0146901 A1* | 5/2016 | Ohta | ................ | G01R 31/3278 324/538 |
| 2023/0021766 A1* | 1/2023 | Lee | ................ | H02J 7/0031 |
| 2024/0047982 A1* | 2/2024 | Green | ................ | B60R 16/033 |
| 2025/0037952 A1* | 1/2025 | Sullivan | ................ | H01H 50/045 |

FOREIGN PATENT DOCUMENTS

| | | | | |
|---|---|---|---|---|
| CN | 106951664 A | * | 7/2017 | ......... G06F 17/5009 |
| CN | 109031977 A | | 12/2018 | |
| CN | 110456268 A | | 11/2019 | |
| CN | 209570690 U | | 11/2019 | |
| CN | 110879588 A | | 3/2020 | |
| CN | 112491629 A | | 3/2021 | |
| CN | 113253130 A | | 8/2021 | |
| CN | 113448316 B | | 8/2022 | |
| CN | 117008572 A | | 11/2023 | |
| CN | 117074931 A | | 11/2023 | |
| CN | 117270491 A | | 12/2023 | |
| CN | 222704664 U | * | 4/2025 | |
| KR | 20230073415 A | | 5/2023 | |

OTHER PUBLICATIONS

Written Opinion and International Search Report for Int'l. Patent Appln. No. PCT/US2025/022684, mailed Aug. 4, 2025 (06 pgs).

* cited by examiner

Primary Examiner — Robert W Beausoliel, Jr.
(74) Attorney, Agent, or Firm — Harrity & Harrity LLP

(57) ABSTRACT

A test system includes a hardware-in-the-loop (HIL) test bench comprising a test controller configured to generate a test signal corresponding to a contactor command; a system controller configured to receive the test signal, generate a control signal based on the test signal, monitor a feedback path for a feedback response, evaluate the feedback response relative to the test signal, and detect a fault based on a mismatch between the test signal and the feedback response; and a contactor comprising a pair of fixed contacts, a main coil configured to receive an activation current based on the control signal, and a movable contact configured to, based on the main coil being energized by the activation current, make contact with the pair of fixed contacts to generate a closed feedback signal as the feedback response.

20 Claims, 3 Drawing Sheets

CONTACTOR INTEGRATION AND PERFORMANCE VALIDATION WITH HARDWARE-IN-THE-LOOP TEST BENCH

TECHNICAL FIELD

The present disclosure relates generally to a test system that includes a hardware-in-the-loop (HIL) test bench and a physical contactor integrated with the HIL test bench.

BACKGROUND

"Hardware-in-the-loop (HIL)" refers to a process of testing hardware by integrating the hardware into a software environment and simulating different real-world scenarios for the hardware to react to. Thus, HIL testing may include testing and validating complex software systems on specially-equipped test benches that receive data inputs from physical devices. For example, HIL testing may include simulating vehicle and environmental inputs for an electronic control unit (ECU) under test, causing the ECU to react as it would to real-world driving conditions that may occur on an open road. HIL testing can run through hundreds or thousands of scenarios without the time and costs associated with conducting real-world tests. HIL testing can accommodate scenarios that would be too dangerous or impractical to test in the real world. HIL tests are repeatable and can be automated. Additionally, HIL testing can accommodate multithreading so that multiple tests can occur at the same time, which may speed up a development process.

Contactors are electromechanical switches used in battery systems that can be operated by a control system, such as an ECU. The ECU may be a controller of a battery management system (BMS). A contactor controls a connection of battery cells to an external electrical circuit. A contactor has an electromagnetic circuit that operates to move a movable contact. Therefore, a contactor has two electrical circuits, including an actuation circuit for actuation and an electrical circuit for carrying currents during a switch-on state. A contactor may be normally open or normally closed. A normally open contactor does not allow current to flow to the external electrical circuit when the actuation circuit is not powered. In contrast, a normally closed contactor allows current to flow to the external electrical circuit when the actuation circuit is not powered. A benefit of the normally open contactor is that the normally open contactor may switch off or disconnect the external electrical circuit when there is a loss of a power supply of the actuation circuit. However, both types of contactors are susceptible to faults, including a permanently closed fault that occurs when the movable contact is stuck in a closed position, and a permanently open fault that occurs when the movable contact is stuck in an open position.

When an ECU of a BMS is tested with an HIL test bench, the contactor may be virtually modeled. Thus, the ECU may be configured, based on a simulation received from the HIL test bench, to receive contactor feedback signals from a processor that virtually models a behavior of the contactor (e.g., a virtual contactor). However, the contactor feedback signals of a virtually modeled contactor may give false results. For example, a weak contactor feedback signal may be perceived by the ECU as an open circuit, despite the virtually modeled contactor being in a closed state (e.g., a turned-on state). Thus, a weak contactor feedback signal may be incorrectly read by the ECU. In addition, the virtually modeled contactor may not be capable of simulating all real-world scenarios as those real-world scenarios actually occur, since the virtually modeled contactor may be limited by its modeling. Thus, some faults may not be detectable with the virtually modeled contactor.

In Chinese Patent Application CN 209570690 U, a tested power management system BMS, a sampling module, hardware-in-loop test equipment, and an upper computer are provided. The upper computer establishes network connection with the hardware-in-loop test equipment, the hardware-in-loop test equipment establishes communication with the BMS, the hardware-in-loop test equipment is in communication with the control end of the sampling module, and the output end of the sampling module is connected with the BMS. The upper computer transmits a test instruction to the hardware-in-loop test equipment, the hardware-in-loop test device receives the test instruction and outputs a control signal corresponding to the test instruction to the BMS, the hardware-in-loop test device transmits a sampling instruction to the sampling module, the sampling module transmits sampling data to the BMS according to the acquired sampling instruction, and the hardware-in-loop test device acquires a test result output by the BMS. In an embodiment, a relay module and high voltage module are included to provide more realistic test data to the BMS. To provide a better approximation of real test data, the relay module and the high voltage module are implemented in cooperation, so as to input fault data for the relay to the BMS and obtain a real state of the relay and a characteristic representation of the relay in the BMS. However, contactor feedback validation from a physical contactor is not provided. Moreover, validating an ECU digital driver is not provided.

A test system of the present disclosure solves one or more of the problems set forth above and/or other problems in the art. For example, the test system includes an HIL test bench and a physical contactor integrated with the HIL test bench.

SUMMARY

In some implementations, a test system includes an HIL test bench comprising a test controller configured to generate a test signal based on a test simulation; a BMS comprising an ECU configured to: receive the test signal, generate a switch control signal based on the test signal, monitor a feedback path for a feedback response, evaluate a feedback response relative to the test signal, and detect a fault based on a mismatch between the test signal and the feedback response; a contactor comprising a pair of fixed contacts, a contactor switch coupled to the feedback path, a main coil configured to receive an activation current, and a movable contact configured to, based on the main coil being energized by the activation current, make contact with the pair of fixed contacts and the contactor switch to generate a closed feedback signal as the feedback response; and a relay switch configured to, based on the switch control signal, couple the main coil to a power supply for generating the activation current.

In some implementations, a test system includes an HIL test bench comprising a test controller configured to generate a test signal corresponding to a contactor command; a system controller configured to: receive the test signal, generate a control signal based on the test signal, monitor a feedback path for a feedback response, evaluate the feedback response relative to the test signal, and detect a fault based on a mismatch between the test signal and the feedback response; and a contactor comprising a pair of fixed contacts, a main coil configured to receive an activation current based on the control signal, and a movable contact configured to, based on the main coil being energized by the activation current, make contact with the pair of fixed contacts to generate a closed feedback signal as the feedback response.

In some implementations, a method includes generating, by an HIL test bench, a test signal based on a test simulation; generating, by an ECU of a BMS, a switch control signal based on the test signal; controlling a relay switch, based on the switch control signal, to energize a main coil of a contactor and cause a movable contact of the contactor to make contact with a pair of fixed contacts of the contactor to generate a closed feedback signal as a feedback response; monitor, by a system controller, a feedback path for the feedback response; evaluate, by the system controller, the feedback response relative to the test signal; and detect, by the system controller, a fault based on a mismatch between the test signal and the feedback response.

DETAILED DESCRIPTION

This disclosure relates to a test system, which is applicable to any machine or device that is controlled by a control system, such as an ECU. An ECU, also known as an electronic control module (ECM), is an embedded system in electronics that controls one or more of the electrical systems or subsystems. The ECU may be a controller (e.g., a system controller) of a battery management system (BMS) and/or may be a controller of an embedded system found in a machine, such as a motor vehicle.

The test system includes a physical (i.e., real) contactor that is integrated with an HIL test bench, instead of a virtual contactor, to replicate actual contactor operations. As a result, the ECU reads actual contactor feedback signals from the physical contactor after sending commands, instead of virtually modeled contactor feedback signals. For example, when the physical contactor is closed, the ECU reads actual feedback instead of virtual feedback. The actual contactor feedback signals may provide a more accurate reading of an actual state of the physical contactor. In other words, the actual contactor feedback signals provide a more accurate real-world representation of a feedback response of the physical contactor than would otherwise be possible using a virtually-modeled contactor. Thus, the actual contactor feedback signals may reduce or prevent erroneous readings. As a result, actual contactor controls can be reliably tested with the ECU using the physical contactor. For example, validation of contactor performance as claimed by a manufacturer and any other issues related to contactor can be identified and resolved at the HIL test bench level.

Figure 1:
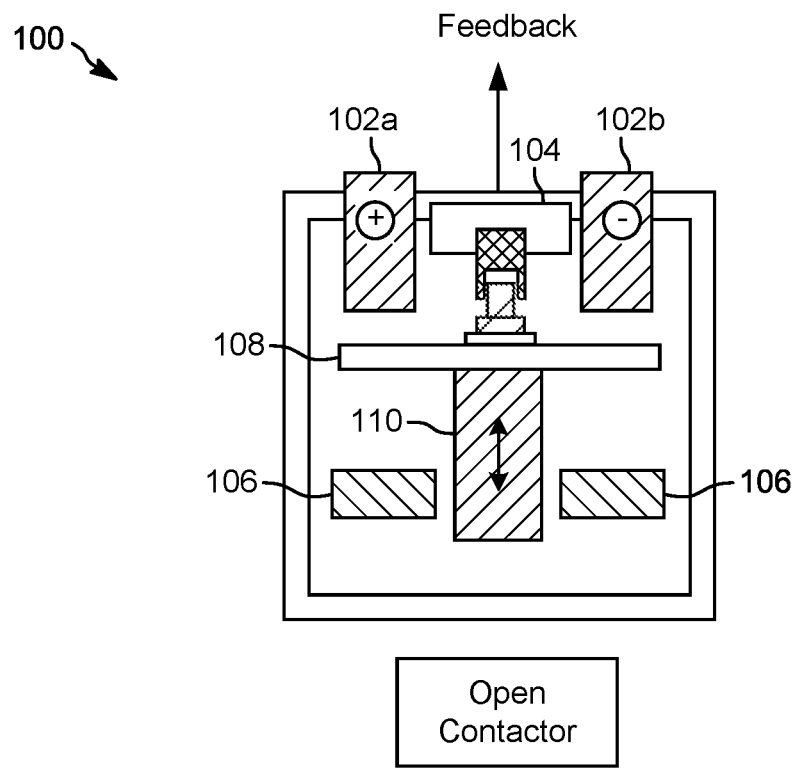
FIG. 1 shows cross-sections of a contactor in an open position and in a closed position.
Figure 1:
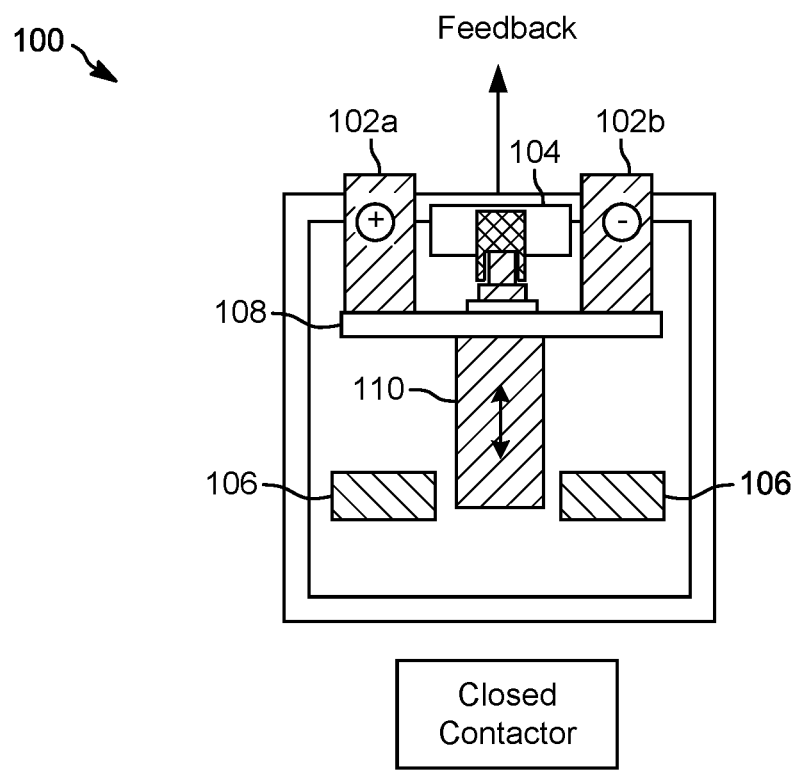

FIG. 1 shows cross-sections of a contactor 100 in an open position and in a closed position. The contactor 100 may be an electromechanical switch used in battery systems that can be operated by a control system, such as an ECU of a BMS. The contactor may control a connection of battery cells to an external electrical circuit. The contactor has an electromagnetic circuit that operates to move a movable contact. Therefore, the contactor has two electrical circuits, including an actuation circuit for actuation and an electrical circuit for carrying currents during a switch-on state. The contactor may be normally open or normally closed.

The contactor 100 may include a pair of fixed contacts 102a and 102b, a contactor switch 104 coupled to the feedback path, a main coil 106 configured to receive an activation current, movable contact 108, and an armature 110 mechanically coupled to the movable contact 108 and magnetically coupled to the main coil 106. The contactor switch 104 may be optional and may be absent in some contactor designs.

The pair of fixed contacts 102a and 102b include a positive contact and a negative contact. In addition, the contactor switch 104 may be coupled to the feedback path and may provide a feedback response based on being electrically coupled to the pair of fixed contacts 102a and 102b by the movable contact 108. The ECU may be coupled to the feedback path and may be configured to monitor the feedback response.

The movable contact 108 may be configured to, based on the main coil 106 being energized by the activation current, make contact with the pair of fixed contacts 102a and 102b and the contactor switch 104 to generate a closed feedback signal as the feedback response. The closed feedback signal may be an electrical signal (e.g., an electrical current) that indicates that the movable contact 108 is in the closed position. Thus, the closed feedback signal may indicate that the movable contact 108 is in contact with the pair of fixed contacts 102a and 102b and the contactor switch 104. Additionally, the movable contact 108 may be configured to, based on the main coil 106 being deenergized, be in a disconnected state from the pair of fixed contacts 102a and 102b and the contactor switch 104 to generate an open connection as the feedback response. Thus, the feedback response may represent an open circuit when the movable contact 108 is in the open position. As a result, no current flows between the pair of fixed contacts 102a and 102b or into the feedback path via the contactor switch 104.

The armature 110 may move the movable contact 108 to be in either a connected state or a disconnected state with the pair of fixed contacts 102a and 102b and the contactor switch 104 based on an energized state of the main coil 106.

Figure 2:
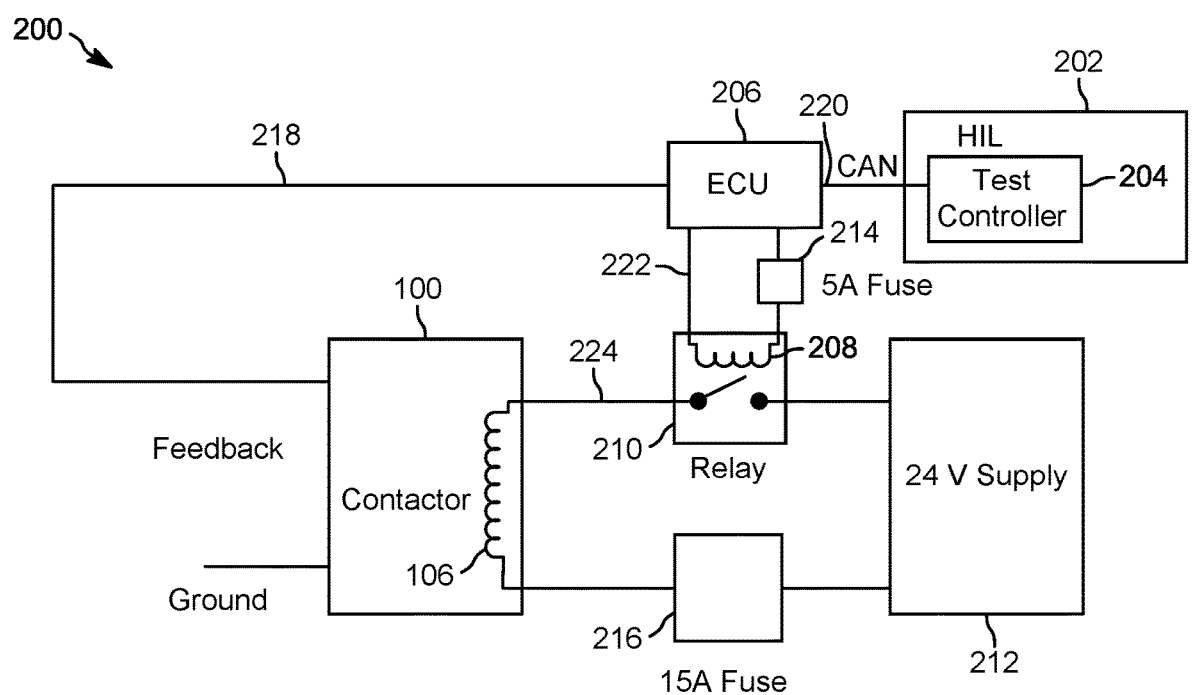
FIG. 2 shows a test system according to one or more implementations.

FIG. 2 shows a test system 200 according to one or more implementations. The test system 200 may include the contactor 100 described in connection with FIG. 1. Additionally, the test system 200 may include an HIL test bench 202 that includes a test controller 204, an ECU 206, an auxiliary coil 208, a relay switch 210, a power supply 212, a first fuse 214, a second fuse 216, and a feedback path 218.

The test controller 204 may generate a test signal 220 based on a test simulation, and provide the test signal 220 to the ECU 206. The test controller 204 may generate the test signal 220 to produce a contactor control sequence including a sequence of open and closed contact commands. For example, the test controller 204 may generate the test signal 220 with a first contactor command (e.g., a first control command) to cause the main coil 106 of the contactor 100 to be energized, and generate the test signal 220 with a second contactor command (e.g., a second control command) to cause the main coil 106 to be deenergized. The test signal 220 may be a controller area network (CAN) communication signal.

The ECU 206 may receive the test signal 220 and generate a switch control signal 222 based on the test signal 220. The ECU 206 may include digital control circuitry that processes the test signal 220 for generating the switch control signal 222. The ECU 206 may include one or more drivers that generate the switch control signal 222 based on control of the digital control circuitry. The auxiliary coil 208 may receive the switch control signal 222 and close the relay switch 210 based on magnetic induction. In other words, the switch control signal 222 may be an electrical current that is turned on and off by the ECU 206 to energize and deenergize the auxiliary coil 208, respectively. When the auxiliary coil 208 is energized, the relay switch 210 may be closed. When the auxiliary coil 208 is deenergized, the relay switch 210 may be open. The relay switch 210 may, based on the switch control signal 222, couple the main coil 106 to the power supply 212 for generating an activation current 224. The power supply 212 may be 24V in this example. Thus, when the relay switch 210 is closed, the relay switch 210 couples the power supply 212 to the main coil 106, completing an actuation circuit and enabling the activation current 224 to flow through the main coil 106. When the relay switch 210 is open, the main coil 106 is disconnected from the power supply 212 and is deenergized. The first fuse 214 may protect the signal path of the switch control signal 222 from overcurrent. For example, the first fuse 214 may be a 5 A fuse.

The ECU 206 may generate the switch control signal 222 in order to control the activation current 224. For example, the ECU 206 may generate the switch control signal 222 to close the relay switch 210 based on receiving the first contactor command from the test controller 204, and may generate the switch control signal 222 to open the relay switch 210 based on receiving the second contactor command from the test controller 204. As described above in connection with FIG. 1, the movable contact 108 may be configured to, based on the main coil 106 being energized by the activation current 224, make contact with the pair of fixed contacts 102a and 102b and the contactor switch 104 to generate a closed feedback signal as the feedback response. Additionally, the movable contact 108 may be configured to, based on the main coil 106 being deenergized, be in a disconnected state from the pair of fixed contacts 102a and 102b and the contactor switch 104 to generate an open connection as the feedback response. The second fuse 216 may protect the signal path of the activation current 224 from overcurrent. For example, the second fuse 216 may be a 15 A fuse.

The ECU 206 is coupled to the feedback path 218 and is configured to monitor the feedback path 218 for the feedback response. The ECU 206 may evaluate the feedback response relative to the test signal 220, and detect a fault based on a mismatch between the test signal 220 and the feedback response. For example, if the ECU 206 receives the first contactor command in the test signal 220, the ECU 206 should receive the closed feedback signal as the feedback response, if the contactor 100 is operating normally. The ECU 206 may detect a permanently open fault if the ECU 206 receives the first contactor command and detects the open connection as the feedback response. Alternatively, if the ECU 206 receives the second contactor command in the test signal 220, the ECU 206 should detect the open connection as the feedback response, if the contactor 100 is operating normally. The ECU 206 may detect a permanently closed fault if the ECU 206 receives the second contactor command and detects the closed feedback signal as the feedback response. Thus, test controller 204 may generate the test signal 220 with a contactor control sequence including a sequence of open and closed contactor commands in order to test an operability of the contactor 100. The ECU 206 may signal the fault to a user and/or to the test controller 204 to indicate a faulty contactor such that additional testing can be performed on the contactor and/or the contactor can be replaced or repaired. In addition, the ECU 206 may validate the operation of its drivers that generate the switch control signal 222 based on the contactor control sequence and the feedback response corresponding to the contactor control sequence. For example, if the feedback response does not match the contactor control sequence of the test signal 220, the ECU 206 may determine that one or more of its drivers is malfunctioning and may signal a fault to the user and/or to the test controller 204 to indicate a faulty driver. Thus, the ECU 206 may validate the switch control signal 222 based on the feedback response (e.g., to determine whether the switch control signal 222 is being generated as intended or not).

Figure 3:
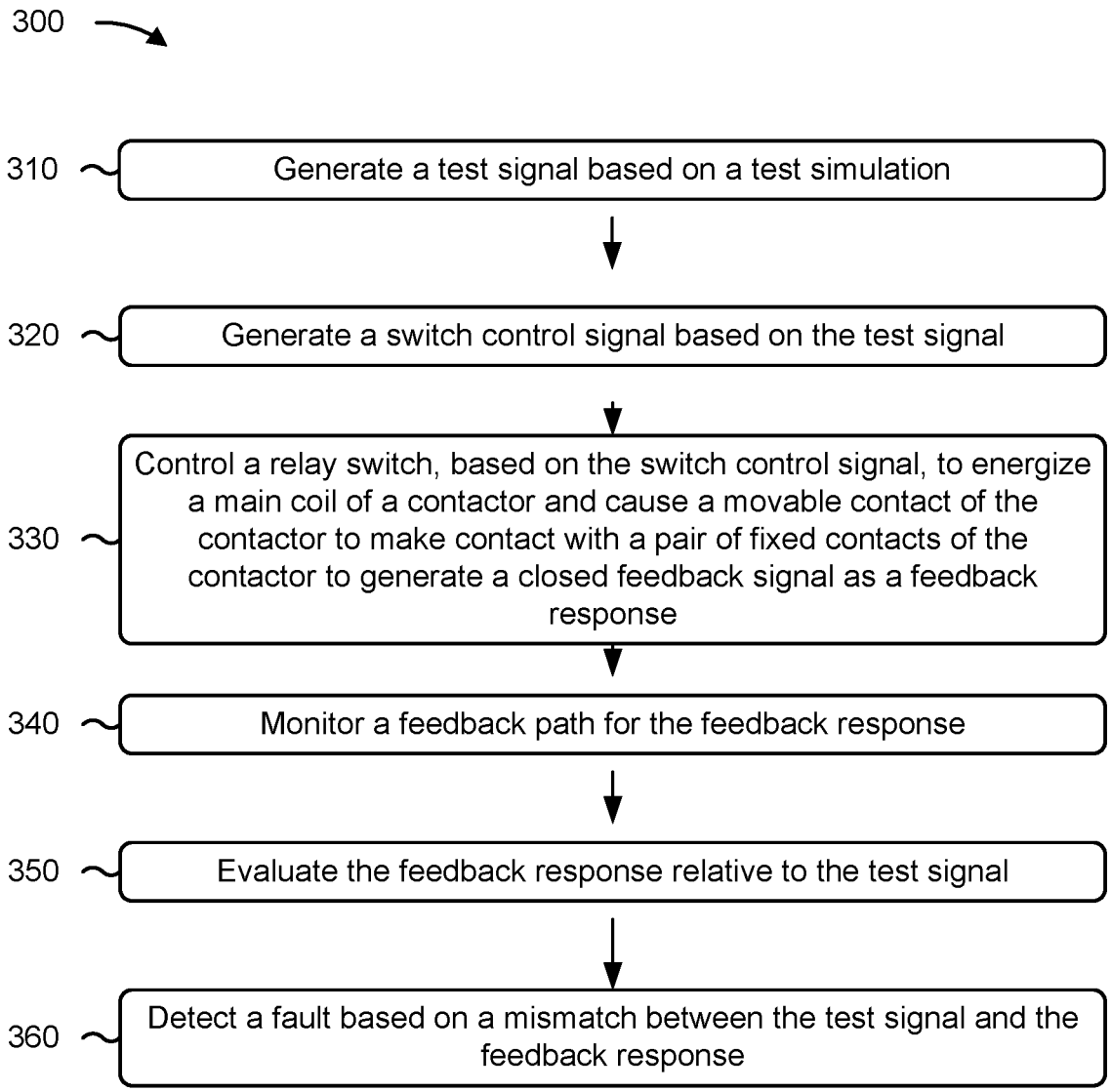
FIG. 3 is a flowchart of an example process associated with performing an HIL test.

FIG. 3 is a flowchart of an example process 300 associated with performing an HIL test. The HIL test may be performed for testing a battery pack and evaluating contactor performance. One or more process blocks of FIG. 3 may be performed by a system controller (e.g., ECU 206). Additionally, or alternatively, one or more process blocks of FIG. 3 may be performed by another device or a group of devices separate from or including the system controller, such as a test controller 204, a relay switch 210, and/or a contactor 100.

As shown in FIG. 3, process 300 may include generating a test signal based on a test simulation (block 310). For example, the test controller 204 may generate the test signal based on the test simulation, as described above. Generating the test signal may include generating the test signal with a first control command to cause the main coil 106 of the contactor 100 to be energized, and generating the test signal with a second control command to cause the main coil 106 of the contactor 100 to be deenergized.

As further shown in FIG. 3, process 300 may include generating a switch control signal based on the test signal (block 320). For example, the ECU 206 may generate the switch control signal based on the test signal, as described above.

As further shown in FIG. 3, process 300 may include controlling a relay switch, based on the switch control signal, to energize a main coil of a contactor and cause a movable contact of the contactor to make contact with a pair of fixed contacts of the contactor to generate a closed feedback signal as a feedback response (block 330). For example, the ECU 206 may control the relay switch 210 to energize the main coil 106 of the contactor 100 and cause the movable contact 108 of the contactor to make contact with the pair of fixed contacts 102a and 102b of the contactor 100 to generate a closed feedback signal as a feedback response, as described above. The process 300 may include controlling the relay switch, based on the switch control signal, to deenergize the main coil and cause the movable contact to be in a disconnected state from the pair of fixed contacts to generate an open connection as the feedback response. For example, the ECU 206 may control the relay switch 210 to deenergize the main coil 106 of the contactor 100 and cause the movable contact 108 to be in a disconnected state from the pair of fixed contacts 102a and 102b to generate an open connection as the feedback response, as described above.

As further shown in FIG. 3, process 300 may include monitoring a feedback path for the feedback response (block 340). For example, the ECU 206 may monitor a feedback path 218 for the feedback response, as described above.

As further shown in FIG. 3, process 300 may include evaluating the feedback response relative to the test signal (block 350). For example, the ECU 206 may evaluate the feedback response relative to the test signal, as described above.

As further shown in FIG. 3, process 300 may include detecting a fault based on a mismatch between the test signal and the feedback response (block 360). For example, the ECU 206 may detect the fault based on the mismatch between the test signal and the feedback response, as described above. Based on the mismatch, the ECU 206 may signal the fault to a user and/or to the test controller 204 to indicate a faulty contactor and/or a faulty driver such that additional testing can be performed on the contactor and/or the contactor can be replaced or repaired. Additionally, or alternatively, based on the mismatch, the ECU 206 may signal a fault to a user and/or to the test controller 204 to indicate a faulty driver such that additional testing can be performed on the ECU 206 and/or the ECU 206 can be replaced or repaired.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The test system includes a physical (i.e., real) contactor that is integrated with an HIL test bench, instead of a virtual contactor, to replicate actual contactor operations. As a result, the ECU reads actual contactor feedback signals from the physical contactor after sending commands, instead of virtually-modeled contactor feedback signals. The actual contactor feedback signals may provide a more accurate reading of an actual state of the physical contactor. Thus, the actual contactor feedback signals may reduce or prevent erroneous readings. As a result, actual contactor controls can be reliably tested with the ECU using the physical contactor. For example, the test system may be used to validate contactor performance as claimed by a manufacturer. In addition, the test system may be used to validate an operability and/or performance of the ECU, including operability of digital control circuitry and/or one or more drivers of the ECU. In addition, additional issues related to contactor can be identified and resolved at the HIL test bench level.

The test system may perform a test sequence including a number of contactor cycles (e.g., 10,000 cycles) performed within a predetermined timeframe, and may evaluate the performance of the contactor 100 for the test sequence. For example, the ECU 206 may indicate to the test controller 204 a number of faults that occur during the test sequence, and a type of fault (e.g., open fault or closed fault) for each occurrence. The ECU 206 and/or the test controller 204 may evaluate a performance of the contactor based on the test sequence, and determine whether the contactor 100 meets one or more specifications claimed by the manufacturer, or whether any additional issues related to the contactor 100 are present for more reliable test results.

What is claimed is:

1. A test system, comprising:
   a hardware-in-the-loop (HIL) test bench comprising a test controller configured to generate a test signal based on a test simulation;
   a battery management system (BMS) comprising an electronic control unit (ECU) configured to:
   receive the test signal,
   generate a switch control signal based on the test signal,
   monitor a feedback path for a feedback response,
   evaluate the feedback response relative to the test signal, and
   detect a fault based on a mismatch between the test signal and the feedback response;
   a contactor comprising a pair of fixed contacts, a contactor switch coupled to the feedback path, a main coil configured to receive an activation current, and a movable contact configured to, based on the main coil being energized by the activation current, make contact with the pair of fixed contacts and the contactor switch to generate a closed feedback signal as the feedback response; and
   a relay switch configured to, based on the switch control signal, couple the main coil to a power supply for generating the activation current.

2. The test system of claim 1, wherein the movable contact is configured to, based on the main coil being deenergized, be in a disconnected state from the pair of fixed contacts and the contactor switch to generate an open connection as the feedback response.

3. The test system of claim 2, wherein the test controller is configured to generate the test signal with a first control command to cause the main coil to be energized, and generate the test signal with a second control command to cause the main coil to be deenergized.

4. The test system of claim 1, further comprising:
   an auxiliary coil configured to receive the switch control signal and close the relay switch based on magnetic induction.

5. The test system of claim 1, wherein the test controller is configured to generate the test signal with a first control command to cause the relay switch to be closed, and generate the test signal with a second control command to cause the relay switch to be open.

6. The test system of claim 1, wherein the pair of fixed contacts include a positive contact and a negative contact.

7. The test system of claim 1, wherein the feedback path is coupled to the contactor switch and the ECU.

8. The test system of claim 1, wherein the test signal is a controller area network (CAN) communication signal.

9. The test system of claim 1, wherein the contactor includes an armature mechanically coupled to the movable contact and magnetically coupled to the main coil, and
   wherein the armature is configured to move the movable contact to be in either a connected state or a disconnected state with the pair of fixed contacts and the contactor switch based on an energized state of the main coil.

10. The test system of claim 1, wherein the test controller is configured to generate the test signal to produce a contactor control sequence including a sequence of open and closed contact commands.

11. A test system, comprising:
    a hardware-in-the-loop (HIL) test bench comprising a test controller configured to generate a test signal corresponding to a contactor command;
    a system controller configured to:
    receive the test signal,
    generate a control signal based on the test signal,
    monitor a feedback path for a feedback response,
    evaluate the feedback response relative to the test signal, and
    detect a fault based on a mismatch between the test signal and the feedback response; and
    a contactor comprising a pair of fixed contacts, a main coil configured to receive an activation current based on the control signal, and a movable contact configured to, based on the main coil being energized by the activation current, make contact with the pair of fixed contacts to generate a closed feedback signal as the feedback response.

12. The test system of claim 11, wherein the movable contact is configured to, based on the main coil being deenergized, be in a disconnected state from the pair of fixed contacts to generate an open connection as the feedback response.

13. The test system of claim 12, wherein the test controller is configured to generate the test signal with a first contactor command to cause the main coil to be energized, and generate the test signal with a second contactor command to cause the main coil to be deenergized.

14. The test system of claim 11, wherein the pair of fixed contacts include a positive contact and a negative contact.

15. The test system of claim 11, wherein the feedback path is coupled to the contactor and the system controller.

16. The test system of claim 11, wherein the contactor includes an armature mechanically coupled to the movable contact and magnetically coupled to the main coil, and
wherein the armature is configured to move the movable contact to be in either a connected state or a disconnected state with the pair of fixed contacts based on an energized state of the main coil.

17. The test system of claim 11, wherein the test controller is configured to generate the test signal to produce a contactor control sequence including a sequence of open and closed contactor commands.

18. A method, comprising:
generating, by a hardware-in-the-loop (HIL) test bench, a test signal based on a test simulation;
generating, by an electronic control unit (ECU) of a battery management system (BMS), a switch control signal based on the test signal;
controlling a relay switch, by a system controller based on the switch control signal, to energize a main coil of a contactor and cause a movable contact of the contactor to make contact with a pair of fixed contacts of the contactor to generate a closed feedback signal as a feedback response;
monitor, by the system controller, a feedback path for the feedback response;
evaluate, by the system controller, the feedback response relative to the test signal; and
detect, by the system controller, a fault based on a mismatch between the test signal and the feedback response.

19. The method of claim 18, further comprising:
controlling the relay switch, by the system controller based on the switch control signal, to deenergize the main coil and cause the movable contact to be in a disconnected state from the pair of fixed contacts to generate an open connection as the feedback response; and
validating the switch control signal based on the feedback response.

20. The method of claim 19, wherein generating the test signal includes generating the test signal with a first control command to cause the main coil to be energized, and generating the test signal with a second control command to cause the main coil to be deenergized.

* * * * *